United States Patent
Schmitz et al.

(10) Patent No.: US 6,188,895 B1
(45) Date of Patent: Feb. 13, 2001

(54) METHOD FOR COUPLING OF TELECOMMUNICATION TERMINALS TO A RADIO NETWORK TERMINATION

(75) Inventors: Georg Schmitz, Bocholt; Ralf Rüther, Coesfeld; Erich Kamperschroer, Hamminkeln; Stefan Nieder, Bocholt, all of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/180,813

(22) PCT Filed: May 16, 1997

(86) PCT No.: PCT/DE97/01007

§ 371 Date: Nov. 16, 1998

§ 102(e) Date: Nov. 16, 1998

(87) PCT Pub. No.: WO97/44966

PCT Pub. Date: Nov. 27, 1997

(30) Foreign Application Priority Data

May 20, 1996 (DE) ............................................ 196 20 198

(51) Int. Cl.$^7$ ...................................................... H04Q 7/20

(52) U.S. Cl. ........................... 455/426; 455/462; 455/463

(58) Field of Search ..................................... 455/426, 435, 455/462, 463, 465, 422, 414, 554, 555

(56) References Cited

U.S. PATENT DOCUMENTS 5,533,027 * 7/1996 Akerberg et al. ..................... 370/347
5,991,630 * 11/1999 Charas ................................. 455/452

FOREIGN PATENT DOCUMENTS 0 301 573    2/1989   (EP) .
WO 93/21719 10/1993  (WO) .
WO 96/13132  5/1996  (WO) .

OTHER PUBLICATIONS

IEEE Communications Magazine, Jan. 1995, David D. Falconer et al, Time Division Multiple Access Methods for Wireless Personal Communications, pp. 50–57.

DECT/GAP standard (Digital European Cordless Telecommunication; cf. (1): Nachrichtentechnik Elektronik 42 (1992) Jan./Feb. No. 1, Berlin, DE; U. Pilger "Struktur des DECT–Standards," pp. 23–29.

Telcom Report 16 (1993), No. 1, J. H. Koch: "Digitaler Komfort für schnurlose Telekommunikation—DECT—Standard eröffnet neue Nutzungsgebiete", pp. 26–27.

tec Feb. 1993—Das technische Magazin von Ascom "Wege zur universellen mobilen Telekommunikation", pp. 35 to 42.

Informatik Spektrum 14, Jun. 1991, No. 3, Berlin, A. Mann, "Der GSM—Standard–Grundlage für dugutake europäische Mobilfunknetze", pp. 137–152.

(List continued on next page.)

Primary Examiner—Reinhard J. Eisenzopf
Assistant Examiner—Duc Nguyen
(74) Attorney, Agent, or Firm—Schiff Hardin & Waite

(57) ABSTRACT

In order to couple further telecommunications terminal end points automatically to a hybrid telecommunications system—in particular an RNT-specific telecommunications system to which a telecommunications terminal end point is connected, an interface structure is in each case created in the telecommunications interfaces between a public telecommunications network and a DECT/GAP-specific RNT system of the hybrid telecommunications system, This interface structure is constructed in such a manner that each telecommunications interface autonomously, for example in accordance with a predetermined calculation algorithm, forms further connection information that is relevant for the telecommunications connection to the other telecommunications appliances, irrespective of the respectively other interface, This is based on first connection information which is stored in the interface and is relevant for the telecommunications connection to one of the telecommunications terminal end points.

20 Claims, 2 Drawing Sheets

OTHER PUBLICATIONS

Nachrichtentech, Elektron, Berlin, vol. 45 (1995), Roland Geissler, Drahtlose ISDN–Kommunikation, pp. 21–23.

Nachrichtentech, Elektron, Berlin, vol. 45 (1995), Radio in the Local Loop, pp. 29–30.

Nachrichtentech, Elektron, Berlin, vol. 41, (1991) Werner Baerwald, "Schnittstellen in der Telekommunikation Teil 1: Standardisierung in der Telekommunikation—ein Überlick", pp. 99–102; Teil 2: pp. 138–143; Teil 1: pp. 179–182; Teil 3 (Schluss): pp. 219–222; Teil 4: pp. 19–20; Teil 5: pp. 59–61; Teil 5 (Schluss): pp. 99–102; Teil 6: pp. 150–153; Teil 7: pp. 238–241; Teil 8: pp. 29–33; Teil 9: pp. 95–97; Teil 9: pp. 129–135; & Teil 10: pp. 187–190.

Philips Telecommunication Review, R.J. Mulder, "DECT, a universal cordless access system", pp. 68–73.

Telcom Report (Siemens) vol. 18, No. 1, Munchen, DE, Jan./Feb. (1995), Reiss, M., Drahtlos zum Freizeichen flexibles RLL–System DECTlink emöglicht schnellen und wirstchaftlichen Teilnehmeranschluss über Funk an öffentiches Telefonnetz, pp. 34–37.

ETSI—Publication, Oct. 1992, ETS 300175 1 . . . 9, Part 1: Overview, pp. 1–30; Part 2: Physical layer, pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

ETSI—Publication, Apr. 1995, prETS 300444, Generic Access Profile, pp. 1–129.

* cited by examiner

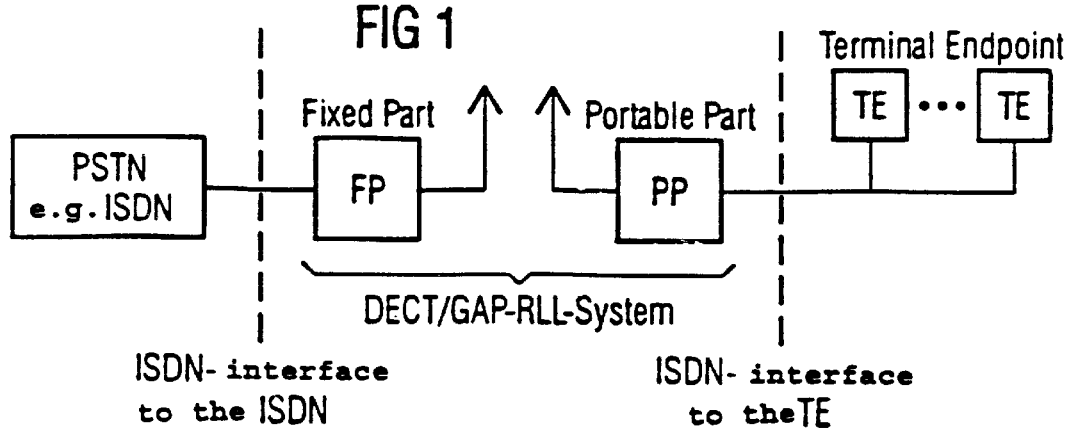
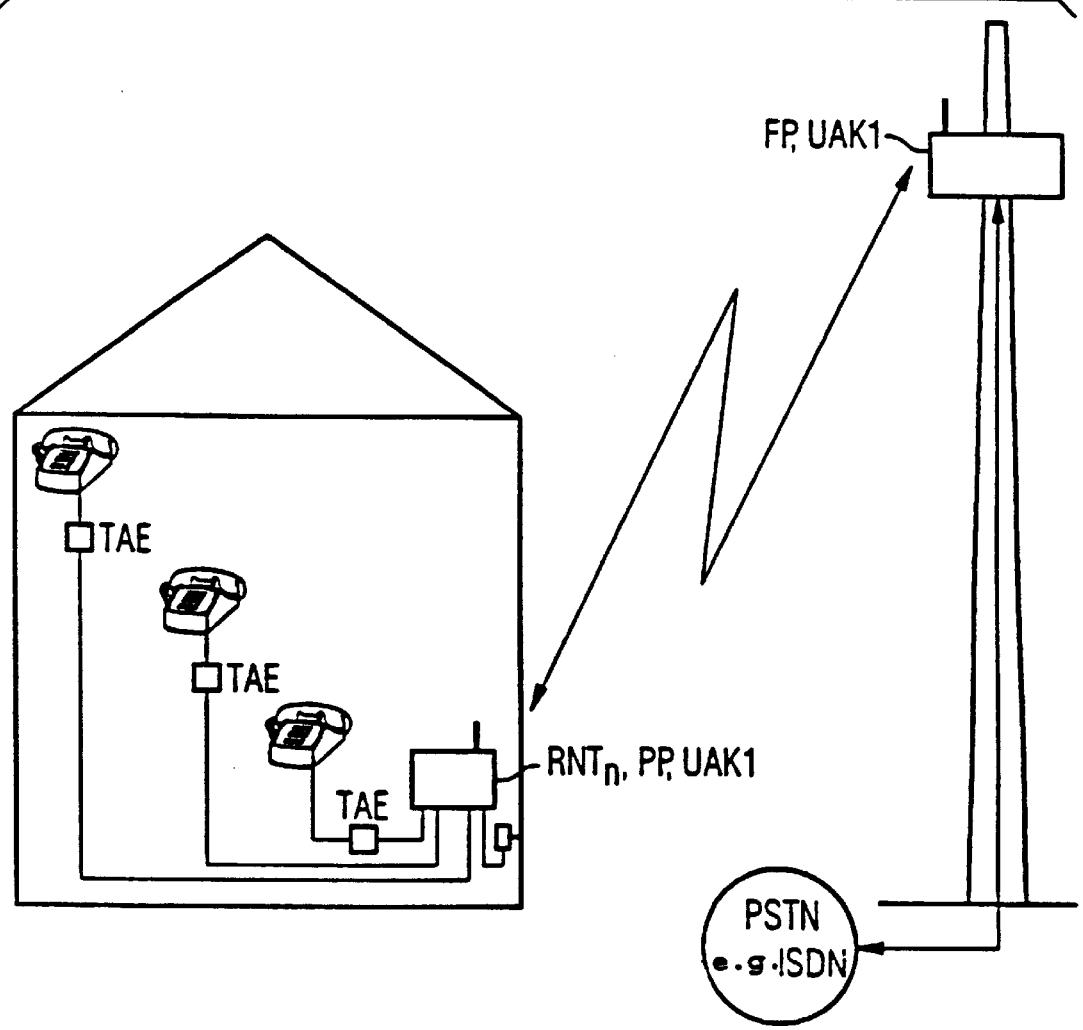

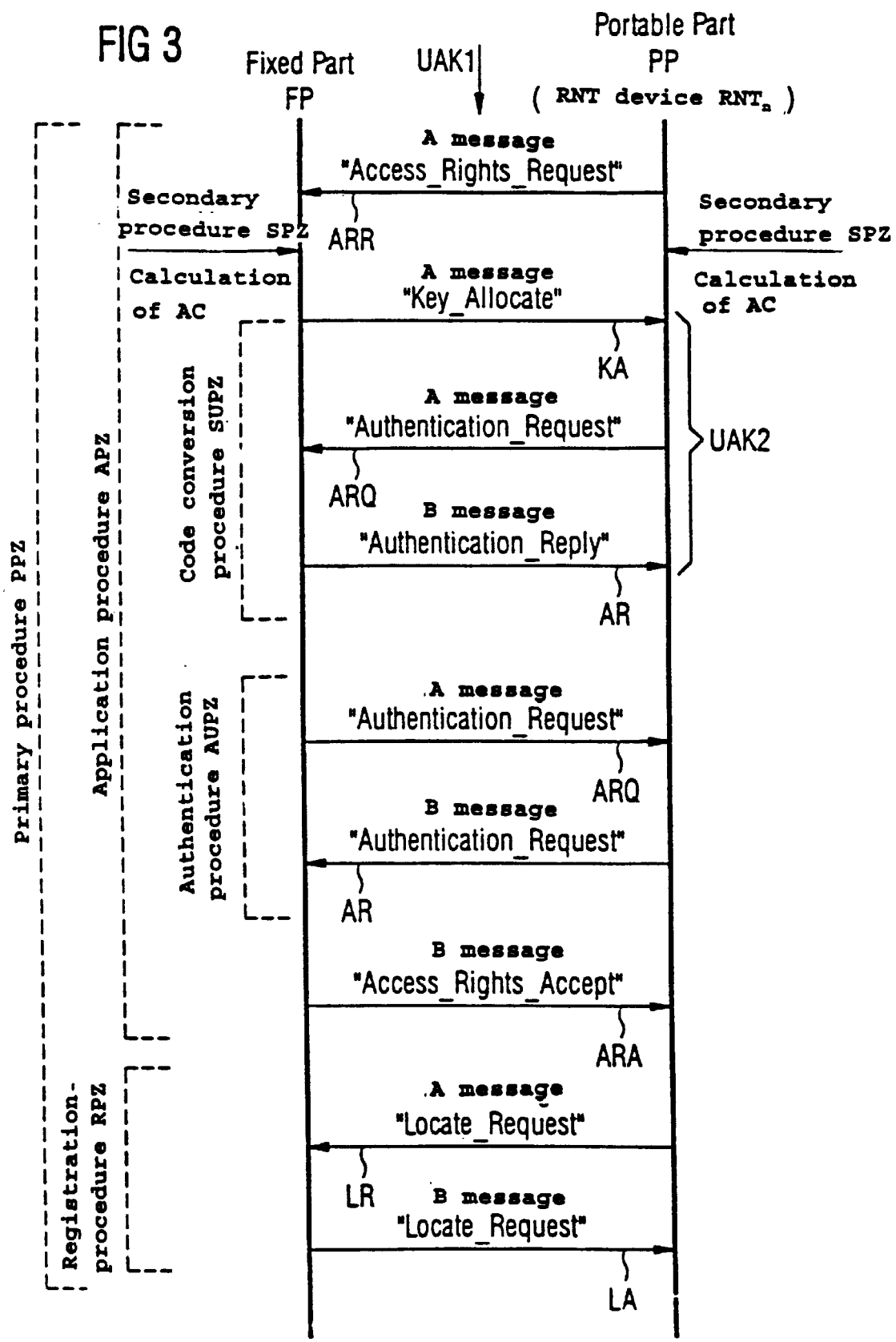

METHOD FOR COUPLING OF TELECOMMUNICATION TERMINALS TO A RADIO NETWORK TERMINATION

BACKGROUND OF THE INVENTION

In telecommunications systems having a telecommunications transmission path between a message source and a message sink, transmitting and receiving appliances are used for message processing and transmission, in which 1) the message processing and message transmission may take place in a preferred transmission direction (simplex operation) or in both transmission directions (duplex operation),
2) the message processing is analogue or digital,
3) the message transmission via the long-distance transmission path is a wire-free—for example in accordance with various radio standards such as DECT, GSM, WACS or PACS, IS-54, PHS, PDC etc.—(see IEEE Communications Magazine, January 1995, Pages 50 to 57; D. D. Falconer et al: "Time Division Multiple Access Methods for Wireless Personal Communications")

"Message" is a generic term which covers both the information and the physical representation (signal). Despite a message having the same information, different signal forms may occur. Thus, for example, a message relating to an item may be transmitted (1) in the form of an image,
(2) as the spoken word,
(3) as the written word,
(4) as an encrypted word or image.

The type of transmission in accordance with (1) . . . (3) is in this case normally characterized by continuous (analogue) signals, while non-continuous signals (e.g. pulses, digital signals) are normally used for the type of transmission in accordance with (4).

On the basis of this general definition of a telecommunications system, the invention relates to telecommunications systems and, in particular, to a method for coupling telecommunications terminal end points to a hybrid telecommunications system, in particular an RNT-specific telecommunications system.

Hybrid telecommunications systems are, for example, telecommunications systems which contain different wire-free and/or wire-based telecommunications subsystems. In order to represent the large number of hybrid telecommunications systems, FIG. 1 shows, on the basis of the documents "Nachrichtentechnik Elektronik" (Telecommunications electronics) Berlin 45 (1995) Issue 1, pages 21 to 23 and Issue 3 pages 29 and 30, a "PSTN (ISDN)↔RLL/WLL" telecommunications system using an ISDN telecommunications subsystem (Public Switched Telecommunications Network (Integrated Services Digital Network)↔Radio Local Loop/Wireless Local Loop) (see document "Nachrichtentechnik Elektronik" (Telecommunications electronics), Berlin 45, Parts: 1 to 10, P1: (1991) Issue 3, pages 99 to 102; P2: (1991) Issue 4, pages 138 to 143; P3:(1991) Issue 5, pages 179 to 182 and Issue 6, pages 219 to 220; P4: (1991) Issue 6, pages 220 to 222 and (1992) Issue 1, pages 19 to 20; P5: (1992) Issue 2, pages 59 to 62 and (1992) Issue 3, pages 99 to 102; P6: (1992) Issue 4, pages 150 to 153; P7: (1992) Issue 6, pages 238 to 241; P8: (1993) Issue 1, pages 29 to 33; P9: (1993) Issue 2, pages 95 to 97 and (1993) Issue 3, pages 129 to 135; P10: (1993) Issue 4, pages 187 to 190;) and an RLL/WLL telecommunications subsystem.

The RLL/WLL telecommunications subsystem is in this case preferably designed as a DECT/GAP system (Digital Enhanced (previously: European) Cordless Telecommunication; see (1): Nachrichtentechnik Elektronik 42 (Telecommunications electronics 42) (1992) Jan./Feb. No. 1, Berlin, Germany; U. Pilger "Struktur des DECT-Standards" (Structure of the DECT standard), pages 23 to 29 in conjunction with the ETSI publication ETS 300175-1 . . . 9, October 1992; (2): Telcom Report 16 (1993), No. 1 J. H. Koch: "Digitaler Komfort fur schnurlose Telekommunikation—DECT-Standard eröffnet neue Nutzungsbiete", [Digital convenience for cordless telecommunications—DECT standard opens up new fields of use], pages 26 and 27;(3): tec 2/93—Das technische Magazin von Ascom "Wege zur universellen mobilen Telekommunikation", (The technical magazine of Ascom "Ways for universal mobile telecommunication"), pages 35 to 42; (4): Philips Telecommunication Review Vol. 49, No. 3, September 1991, R. J. Mulder: "DECT, a universal cordless access system"; (5): WO 93/21719 (FIGS. 1 to 3 with associated description); Generic Access Profile; see ETSI Publication prETS 300444, April 1995, Final Draft, ETSI, FR). The DECT/GAP-specific RLL/WLL telecommunications subsystem according to the DECT/GAP standard has a Fixed Part FP with, for example, an ISDN interface to an ISDN network and a Portable Part PP with, for example, an ISDN interface to ISDN Terminal Endpoints TE.

The wire-free connection technique RLL (Radio in the Local Loop), for example including a DECT system, is in this case intended to make ISDN services available to the ISDN subscriber on standard ISDN interfaces.

The use of radio channels (for example DECT) in classical cable-based telecommunications subsystems, such as the ISDN, is becoming increasingly important, particularly against the background of future alternative network operators without their own complete cable network.

The RLL/WLL telecommunications subsystem can alternatively also be designed as a GSM system (Groupe Spéciale Mobile or Global System for Mobile Communication; see Informatik Spektrum (Information spectrum) 14 (1991) June, No. 3, Berlin, Germany; A. Mann: "Der GSM Standard—Grundlage für digitale europäische Mobilfunknetz" (the GSM standard—Basis of digital European mobile radio network), pages 137 to 152). Furthermore, other options for the implementation of an RLL/WLL telecommunications subsystem are the systems mentioned initially as well as future systems which are based on the known multiple access methods FDMA, TDMA, CDMA (Frequency Division Multiple Access, Time Division Multiple Access, Code Division Multiple Access) and hybrid multiple access methods formed from them.

One specific application of the wire-free connection technique RLL (Radio in the Local Loop) is the RNT principle (Radio Network Termination), based on the ISDN basic connection technique.

FIG. 2 shows a DECT/GAP-specific RNT telecommunications subsystem, in which the fixed part FP has a telecommunications connection to the public telecommunications network and an RNT device $RNT_n$, which carries out the function of the portable part PP according to FIG. 1 and has a number "n" of telecommunications connections to telecommunications terminal end points $TE_1 \ldots TE_n$ (e.g. n=3). When the DECT/GAP-specific RNT device $RNT_n$ (cordless telephone connection) is used, this must be registered at the public fixed part FP.

By virtue of the administration technique, the RNT device $RNT_n$ has only a single unique IPUI identity (International Portable User Identity). If this RNT device $RNT_n$ is installed in an apartment block having a number of terminal end point subscribers $TE_1 \ldots TE_n$ and if, for example, and if, for example, only one of the subscribers, for example the subscriber $TE_1$, wishes to have a connection to the telecommunications network at the time when the RNT device $RNT_n$ is installed, then the RNT device $RNT_n$ is registered for the subscriber $TE_1$, by the service technician, locally, on commissioning as a unit at the public fixed point FP. As a consequence of this registration, only the connection of the subscriber $TE_1$ has access authorization to the fixed part FP and thus to the public network PSTN, ISDN.

For registration, the surface technician has to enter, via a telephone which is connected to the RNT device $RNT_n$, a unique PARK identity word (Portable Access Rights Key) which is specific to the fixed part, and an AC word (Authentication Code). The AC word is a PIN word (Personal Identity Number) in order to allow access to the fixed part FP. During the registration process, the RNT device $RNT_n$, which carries out the function of the portable part PP, and the fixed part FP calculate—in accordance with ETSI publication ETS 300175-7, October 1992, pages 1 to 104 and, in particular page 10—a UAK value UAK1 (User Authentication Key).

If, as time goes by, for example after a time interval, other subscribers in the apartment block wish to be connected to the RNT device $RNT_n$ and thus be given access authorization to the fixed part FP, then a service technician has to carry out the registration process described above, locally, every time. This is associated with high complexity and, accordingly, high costs.

SUMMARY OF THE INVENTION

The object on which the invention is based is to couple further telecommunications terminal end points automatically to a hybrid telecommunications system—in particular an RNT-specific telecommunications system—to which a telecommunications terminal end point is coupled.

In general terms the present invention is a method for coupling telecommunications terminal end points to a hybrid telecommunications system, in particular an RNT-specific telecommunications system. The hybrid telecommunications system containing a first telecommunications subsystem and a second telecommunications sub-system for transmitting system messages. The second telecommunications sub-system having a first telecommunications interface and a second telecommunications interface for transmitting the system messages and for transmitting sub-system messages of the second telecommunications sub-system. The second telecommunications sub-system is connected by telecommunication at least via the first telecommunications interface to the first telecommunications sub-system. The telecommunications terminal end points are coupled via the second telecommunications interface to the telecommunications system in that telecommunications connections for transmitting the system messages and the sub-system messages are set up by primary procedures which run between the first telecommunications interface and the second telecommunications interface. When the primary procedures are completed, connection information which indicates that the telecommunications connections have been set up is stored in the telecommunications interfaces. A secondary procedure is carried out, in which intermediate information is formed from first connection information which is stored in the respective telecommunications interface and indicates a first telecommunications connection. A first primary procedure for setting up a second telecommunications connection is carried out in the two telecommunications interfaces. The intermediate information from the respective telecommunications interface is included in the first primary procedure such that, when the first primary procedure is completed, the second connection information, which indicates that the second telecommunications connection has been set up is stored in the respective telecommunications interface.

The first primary procedure and the secondary procedure are carried out for a number "n" of telecommunications connections for coupling the telecommunications terminal end points to the telecommunications system for every x-th telecommunications connection where "$2 \leq x \leq n$".

The intermediate information for setting up the x-th telecommunications connection is formed from the connection information which has been stored for the longest time in the respective telecommunications interface.

The intermediate information for setting up the x-th telecommunications connection is formed from the connection information which has been stored for the shortest time in the respective telecommunications interface.

The primary procedure is composed of four sub-procedures, an application procedure, a registration procedure, a code conversion procedure and an authentication procedure.

The secondary procedure is carried out before and during the first primary procedure.

The secondary procedure is carried out during the first primary procedure.

The secondary procedure is carried out before the first primary procedure.

The first connection information contains a first user-specific authentication code, and the second connection information contains a second user-specific authentication code.

The intermediate information contains an authentication code.

The first telecommunications sub-system is a cable-based telecommunications system, and the telecommunications terminal end point is a cable-based telecommunications appliance.

The first telecommunications sub-system is a cable-based telecommunications system, and the telecommunications terminal end point is a cordless telecommunications appliance.

The second telecommunications system is a cordless telecommunications system, the first telecommunications interface is a cordless base station and the second telecommunications interface is a cordless-specific RNT device.

The cordless telecommunications sub-system is a DECT/GAP system, the first telecommunications interface is a DECT/GAP base station and the second telecommunications interface is a DECT/GAP-specific RNT device.

The second telecommunications sub-system is a mobile radio telecommunications system, the first telecommunications interface is a mobile radio base station and the second telecommunications interface is a mobile-radio-specific RNT device.

The second telecommunications sub-system is a GSM system, the first telecommunications interface is a GSM base station, and the second telecommunications interface is a GSM-specific RNT device.

The idea on which the invention is in this case based is in each case to provide an interface structure in telecommunications interfaces between a first telecommunications subsystem (for example a public telecommunications network) and a second telecommunications subsystem (for example an RNT telecommunications subsystem) of a hybrid telecommunications system, it being possible to connect the second telecommunications subsystem to a plurality of telecommunications appliances by means of telecommunication, this interface structure being designed in such a manner that each telecommunications interface autonomously, for example in accordance with a predetermined calculation algorithm, forms further connection information, which is relevant for the telecommunications connection to the other telecommunications appliances, independently of the respectively other interface, on the basis of first connection information which is stored in the interface and is relevant for the telecommunications connection to one of the telecommunications appliances.

In this case, in particular, the DECT/GAP-specific conditions are that 1) no authentication-relevant information for example the AC word (Authentication Code)] may be transmitted via the RNT radio interface for registration of the telecommunications appliances in the RNT telecommunications subsystem, 2) no authentication-relevant information [for example the AC word (Authentication Code)] may be stored in the telecommunications interfaces for the registration of the telecommunications appliances in the RNT telecommunication subsystem.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a telecommunication system using an ISDN telecommunication subsystem;

FIG. 2 depicts a DECT/GAP specific RNT telecommunications subsystem; and

FIG. 3 depicts a stimulus state diagram according to the present invention.

DESCRIPTION OF THE PREFERRED EMBODIMENTS

On the basis of the DECT/GAP-RNT system according to FIG. 2, FIG. 3 shows in a stimulus state diagram "fixed part FP↔RNT device $RNT_n$" the sequence of registration of the connection of an x-th telecommunications terminal end point of the "n" telecommunications terminal end points $TE_1 \ldots TE_n$, where "$2 \leq x \leq n$", once a first telecommunications terminal end point, for example the telecommunications terminal end point $TE_1$, has previously already been connected in a manner specified in the description of FIG. 2.

As a result of the fact that a telecommunications connection already exists between the RNT device $RNT_n$ and the fixed part FP, because of the connection of the telecommunications appliance $TE_1$ to the RNT device $RNT_n$, the UAK value UAK1 (User Authentication Key; initial connection information) resulting from this connection is known in the fixed part FP and in the RNT device $RNT_n$.

According to FIG. 3, a primary procedure PPZ is carried out on the fixed part FP in order to connect the x-th telecommunications terminal end point to the RNT device $RNT_n$. This application of the primary procedure PPZ is preferably carried out via the connection which already exists on the basis of the connection of the telecommunications terminal end point $TE_1$ to the RNT device $RNT_n$.

At the start of the primary procedure PPZ, an A message "Access_Rights_Request" (see ETSI publication ETS 300175-5, October 1992, Chapter 6.3.6.3) is sent from the RNT device $RNT_n$ (portable part PP) in the course of an application procedure APZ. The fixed part FP receives this A message ARR and, for its part, sends an A message "Key_Allocate" KA (see ETSI publication ETS 300175-5, October 1992, Chapter 6.3.6.16) during the primary procedure PPZ and the application procedure APZ, in the course of a code conversion procedure SUPZ.

At the start of the code conversion procedure SUPZ, a secondary procedure SPZ must have been completed both in the fixed part FP and in the RNT device $RNT_n$, by means of which secondary procedure SPZ an AC reference word AC (Authentication Code; intermediate information) is determined from the respectively stored UAK value UAK 1 using a defined algorithm. According to FIG. 3, the secondary procedure SPZ is started by the fixed part FP and the RNT device $RNT_n$ during the primary procedure.

Alternatively, it is also possible to allow this secondary procedure SPZ to be started and ended before the start of the primary procedure PPZ or to start it before the start of the primary procedure PPZ, but not to allow it to be ended until after the start of the primary procedure PPZ and before the encryption procedure VPZ.

Using the AC reference word and the PARK identity stored in the RNT device $RNT_n$, all the connections of the RNT device $RNT_n$ can be registered in the fixed part FP from now on.

The respective registration is carried out by means of a registration procedure RPZ, which follows a B message "Access_Rights_Accept" ARA (see ETSI publication ETS 300175-5, October 1992, Chapter 6.3.6.1) which ends the application procedure APZ and is sent from the fixed part FP to the RNT device $RNT_n$. This registration is terminated by the transmission of an A message "Locate_Request" LR (see ETSI publication ETS 300175-5, October 1992, Chapter 6.3.6.19) from the RNT device $RNT_n$ to the fixed part FP and a B message "Locate_Accept" LA (see ETSI publication ETS 300175-5, October 1992, Chapter 6.3.6.20) from the fixed part FP to the RNT device $RNT_n$, and before this is done, in the present case, the code conversion procedure SUPZ continues with an authentication procedure AUPZ, which follows this, in the course of the application procedure APZ.

As already mentioned above, the code conversion procedure SUPZ starts with the A message "Key_Allocation" KA, which is sent from the fixed part FP to the RNT device $RNT_n$. During this code conversion procedure SUPZ, a primary-procedure-specific second UAK value UAK2 (second connection information) is calculated, in particular, from the AC reference value. For this calculation, following an A message KA, an A message "Authentication_Request" ARQ (see (ETSI publication ETS 300175-5, October 1992, Chapter 6.3.6.9) is sent from the RNT device $RNT_n$ to the fixed part FP and a B message ("Authentication_Reply" AR (see ETSI publication ETS 300175-5, October 1992, Chapter 6.3.6.8) in sent from the fixed part FP to the RNT device $RNT_n$, and this ends the code conversion procedure SUPZ.

The code conversion procedure SUPZ is followed by the authentication procedure AUPZ that has already been mentioned. Like the code conversion procedure SUPZ, this contains the A message "Authentication_Request" ARQ (see ETSI publication ETS 300175-5, October 1992, Chapter 6.3.6.9) which, in fact, in contrast to the code conversion procedure SUPZ, is transmitted from the fixed part FP to the RNT device $RNT_n$. In addition, the authentication procedure AUPZ, like the code conversion procedure SUPZ, contains the B message "Authentication_Reply" AR (see ETSI publication ETS 300175-5, October 1992, Chapter 6.3.6.8) which, once again in contrast to the code conversion procedure SUPZ, is transmitted from the RNT devise $RNT_n$ to the fixed part FP.

After the authentication procedure AUPZ, the application procedure APZ is ended, as already mentioned, by the B message "Access_Rights_Accept" ARA (see ETSI publication ETS 300175-5, October 1992, Chapter 6.3.6.1).

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for coupling telecommunications terminal end points to a hybrid telecommunications system, comprising the steps of:
   a) providing a hybrid telecommunications system containing a first telecommunications sub-system and a second telecommunications sub-system for transmitting system messages;
   b) providing in the second telecommunications sub-system having a first telecommunications interface and a second telecommunications interface for transmitting the system messages and for transmitting sub-system messages of the second telecommunications sub-system;
   c) connecting the second telecommunications sub-system by telecommunication at least via the first telecommunications interface to the first telecommunications sub-system;
   d) coupling the telecommunications terminal end points via the second telecommunications interface to the telecommunications system in that telecommunications connections for transmitting the system messages and the sub-system messages are set up by primary procedures which run between the first telecommunications interface and the second telecommunications interface;
   e) storing, when the primary procedures are completed, connection information which indicates that the telecommunications connections have been set up in the telecommunications interfaces;
   f) carrying out a secondary procedure, in which intermediate information is formed from first connection information which is stored in the respective telecommunications interface and indicates a first telecommunications connection;
   g) carrying out a first primary procedure for setting up a second telecommunications connection in the two telecommunications interfaces; and
   h) including the intermediate information from a respective telecommunications interface of the first and second telecommunications interfaces in the first primary procedure such that, when the first primary procedure is completed, the second connection information, which indicates that the second telecommunications connection has been set up is stored in the respective telecommunications interface.

2. The method according to claim 1, wherein the first primary procedure and the secondary procedure are carried out for a number "n" of telecommunications connections for coupling the telecommunications terminal end points to the telecommunications system for every x-th telecommunications connection where "$2 \leq x \leq n$".

3. The method according to claim 2, wherein the intermediate information for setting up the x-th telecommunications connection is formed from the connection information which has been stored for a longest time in the respective telecommunications interface.

4. The method according to claim 2, wherein the intermediate information for setting up the x-th telecommunications connection is formed from the connection information which has been stored for a shortest time in the respective telecommunications interface.

5. The method according to claim 1, wherein the primary procedure is composed of four sub-procedures, an application procedure, a registration procedure, a code conversion procedure and an authentication procedure.

6. A method according to claim 1, wherein the secondary procedure is carried out before and during the first primary procedure.

7. The method according to claim 1, wherein the secondary procedure is carried out during the first primary procedure.

8. The method according to claim 1, wherein the secondary procedure is carried out before the first primary procedure.

9. The method according to claim 1, wherein the first connection information contains a first user-specific authentication code, and the second connection information contains a second user-specific authentication code.

10. The method according to claim 1, wherein the intermediate information contains an authentication code.

11. The method according to claim 1, wherein the first telecommunications sub-system is a cable-based telecommunications system, and the telecommunications terminal end point is a cable-based telecommunications appliance.

12. The method according to claim 11, wherein the second telecommunications system is a cordless telecommunications system, the first telecommunications interface is a cordless base station and the second telecommunications interface is a cordless-specific RNT device.

13. The method according to claim 12, wherein the cordless telecommunications sub-system is a DECT/GAP system, the first telecommunications interface is a DECT/GAP base station and the second telecommunications interface is a DECT/GAP-specific RNT device.

14. The method according to claim 11, wherein the second telecommunications subsystem is a mobile radio telecommunications system, the first telecommunications interface is a mobile radio base station and the second telecommunications interface is a mobile-radio-specific RNT device.

15. The method according to claim 14, wherein the second telecommunications subsystem is a GSM system, the first telecommunications interface is a GSM base station, and the second telecommunications interface is a GSM-specific RNT device.

16. The method according to claim 1, wherein the first telecommunications sub-system is a cable-based telecommunications system, and the telecommunications terminal end point is a cordless telecommunications appliance.

17. The method according to claim 16, wherein the second telecommunications system is a cordless telecommunications system, the first telecommunications interface is a cordless base station and the second telecommunications interface is a cordless-specific RNT device.

18. The method according to claim 17, wherein the cordless telecommunications sub-system is a DECT/GAP system, the first telecommunications interface is a DECT/GAP base station and the second telecommunications interface is a DECT/GAP-specific RNT device.

19. The method according to claim 16, wherein the second telecommunications subsystem is a mobile radio telecommunications system, the first telecommunications interface is a mobile radio base station and the second telecommunications interface is a mobile-radio-specific RNT device.

20. The method according to claim 19, wherein the second telecommunications subsystem is a GSM system, the first telecommunications interface is a GSM base station, and the second telecommunications interface is a GSM-specific RNT device.

* * * * *